Feb. 16, 1960   H. LEIBACH   2,924,937
GAS TURBINE
Filed June 25, 1956
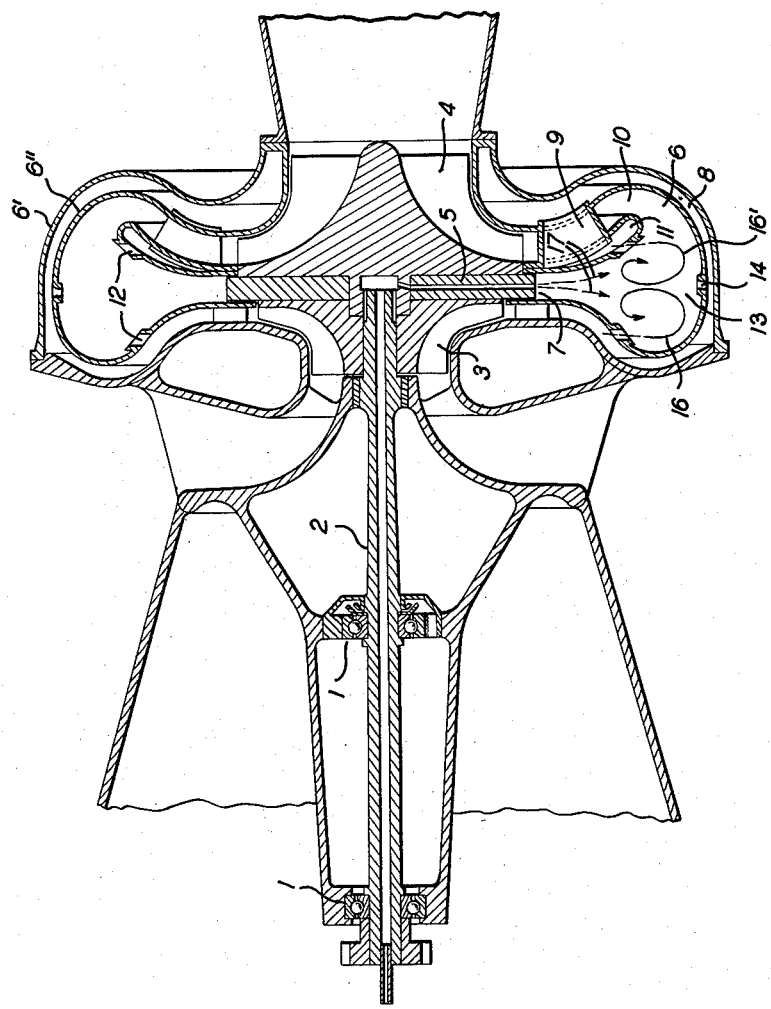
INVENTOR
HEINRICH LEIBACH
BY *Dicke and Craig*
ATTORNEYS United States Patent Office 2,924,937
Patented Feb. 16, 1960

2,924,937

GAS TURBINE

Heinrich Leibach, Munich, Germany, assignor to BMW Triebwerkbau Gesellschaft mit beschraenkter Haftung Application June 25, 1956, Serial No. 593,664

Claims priority, application Germany June 28, 1955

8 Claims. (Cl. 60—39.36)

The present invention relates to a gas turbine, and more particularly to small gas turbines provided with rotary fuel injection or atomization means and with the compressor rotor and the turbine rotor thereof disposed adjacent one another about which an annularly-shaped combustion chamber is arranged.

The present invention aims at an improvement of the combustion chamber efficiency by the intimate turbulence or vorticity of the combustion air with the fuel accompanied by simultaneous intensive cooling of the combustion chamber walls.

Accordingly, it is an object of the present invention to provide a construction for a gas turbine which exhibits an improved combustion efficiency.

It is another object of the present invention to provide improved combustion efficiency in gas turbine by the intimate mixing of combustion air with combustion fuel.

Still another object of the present invention is the provision of an arrangement in a gas turbine in which the fuel and air are so fed into the combustion chamber as to provide intimate mixing therebetween due to the particular turbulence produced by the particular feed thereof into the combustion chamber.

Still another object of the present invention is the provision of a gas turbine which is simple in structure, reliable in operation and compact in design and which simultaneously therewith produces an effective intensive cooling action insofar as the walls of the combustion chamber are concerned.

Still another object of the present invention resides in the provision of a gas turbine construction in which the various parts thereof are so constructed as to provide an efficient cooling system for the combustion chamber walls and which enables the use of lower grade material for certain parts which need not exhibit the high heat resistance required of the prior art devices.

Another object of the present invention is the provision of a gas turbine in which the compressor rotor and turbine rotor are disposed adjacent one another, preferably in nested relation with one another, and in which the individual parts of the compressor rotor and turbine rotor may be made of different materials as regards the heat resistance thereof, an atomizer or fuel injecting disk of heat insulating material being disposed between the adjacent surfaces of the rotors.

These and other objects, features and advantages of the present invention will become more obvious from the following description when taken in connection with the accompanying drawing which shows, for purposes of illustration only, one embodiment in accordance with the present invention and wherein the single figure is a cross sectional view through a gas turbine in accordance with the present invention.

Gas turbines with rotary fuel atomization or injection means and with an annular combustion chamber disposed about the rotors are known in the prior art, in which the combustion air carries out a spiral movement within the annular combustion chamber and in which the fuel is introduced in uniflow with the circulating combustion air, i.e., in which the combustion air is introduced or injected in the same direction, for example, tangentially, to the direction of the combustion air. A cooling effect of the combustion chamber walls in such prior art construction was to have been achieved solely by the fact that as a result of the rotary movement of the gases the heavier, cooler particles or masses thereof impinge upon and sweep over the walls of the combustion chamber whereas the hotter gases flow more nearly to the axis of rotation.

The present invention contemplates a further development and improvement of such known combustion chambers and consists in supplying or injecting the fuel by means of an atomizer or sprayer disk which is arranged in an annular gap or slot between the compressor rotor and the turbine rotor, while the compressed combustion air, which is compressed by the compressor, flows over a receiving or inlet space, which is formed between the two walls of the double-walled construction of the combustion chamber, and therefrom through a plurality of slots or apertures disposed along the periphery of the inner combustion chamber wall into the combustion chamber from both sides of the fuel atomization or injection plane as determined by the atomizer or sprayer disk.

According to a further feature of the present invention the inflow slots or apertures provided in the inner combustion chamber wall are arranged at an incline to the direction of rotation as well as also to the plane of fuel atomization or injection.

Referring now to the drawing which shows one embodiment in accordance with the present invention, reference numeral 2 indicates a shaft which is supported in ball bearings 1. The compressor rotor 3 and turbine rotor 4 are arranged at the end of the shaft 2 in overhung or nested relationship. A fuel injection or atomizer disk 5 is secured between the compressor rotor 3 and the turbine rotor 4.

An annular combustion chamber 6 formed by a double walled construction consisting of walls 6' and 6" is arranged about both rotors 3 and 4 in such a manner that the injection or atomizer disk 5 rotates in an annularly shaped gap 7 of the combustion chamber 6. The compressed air supplied by the compressor 3 into the receiving or inlet space 8 formed by the two walls 6' and 6" of the combustion chamber 6 flows around or circumcirculates the combustion chamber 6. The guide vanes or entrance buckets 9 of the turbine, which are of hollow construction, penetrate thereby into the combustion chamber exit or outlet 10 which is arranged tangentially thereto and simultaneously therewith provide a connection or communication between the receiving or inlet space 8 and the interior space 11 through the hollow construction thereof.

The compressed air flows from the spaces 8 and 11 through a plurality of slots or apertures 12 disposed along the periphery of the inner combustion chamber wall into the combustion chamber 6 symmetrically to the injection or atomization plane 13. The inlet slots or apertures 12 thereby extend at an incline to the fuel atomization or injection plane 13, i.e., the axis of slots 12 are non-parallel to the plane 13, so that in the interior of the combustion chamber 6 two eddying currents or vortices indicated by arrows 16 and 16' are formed which rotate oppositely with respect to each other. This formation of the secondary eddying currents or vortices 16 and 16' is enhanced by further slots or bores 14 through which the combustion air flows into the combustion chamber 6 in a direction opposite to the direction of fuel injection indicated by arrows 17.

By the additional inclination of the slots or apertures 12 in the direction of rotation of the rotors 3 and 4, i.e., by an arrangement of the axes of slots 12 at an angle to the plane of the drawing in the direction of rotation of the various parts, the air is supplied to the combustion chamber 6 in such a manner that a rotation of the combustion air eddies or vortexes 16 and 16' about the axis of rotation thereof is attained.

The fuel is supplied to the injection or atomization disk 5 in metered quantities through the hollow shaft 2 and is thrown out over two or more bores distributed along the periphery of the disk 5 by the centrifugal force produced during rotation thereof and is thereby effectively atomized.

By the symmetrical arrangement of the air inflow slots or apertures on both sides of the atomization or injection plane and by the inclined arrangement thereof, secondary eddying currents or vortexes are formed in the interior of the combustion chamber which effect a rapid intimate mixing of the fuel with the combustion air. The formation of the vortexes or eddies may be enhanced by a plurality of bores or slots along the periphery of the combustion chamber through which a part of the combustion air is blown into the combustion chamber in opposition to the direction of injection of the fuel.

The conduction of the compressed air through the part of the double walled combustion chamber, which serves as receiving or inlet space, has simultaneously the effect of an intensive cooling of the walls whereby the use of materials having less heat resistance is possible for the combustion chamber. Preferably the compressor rotor and turbine rotor are formed by the use of different materials as two individual parts. The fuel atomizer or injection disk arranged between the two rotors is thereby made in accordance with the present invention of a material having slight heat conductivity such as, for instance, austenitic steel or ceramic material, i.e., of heat insulating material.

While I have shown and described one preferred embodiment in accordance with the present invention, it is understood that my invention is not limited thereto but is susceptible of many changes and modifications, and I intend to cover all such changes and modifications except as defined by the appended claims.

I claim:

1. A gas turbine provided with compressor and turbine rotors disposed adjacent one another and a gap formed therebetween and provided with an annularly shaped combustion chamber surrounding at least in part said rotors and being provided with annular inlet means, fuel injection means disposed in said gap between said two rotors for injecting the fuel directly into said annularly-shaped combustion chamber through said inlet means and defining a plane of injection, means defining an annular duct surrounding said annularly shaped combustion chamber over more than one-half the outer circumference thereof for indirectly supplying essentially all the combustion air from said compressor rotor to said combustion chamber through said duct, the inner wall of said duct being provided with inlet means located on both sides with respect to said plane of injection to thereby produce oppositely directed secondary combustion air vortexes within said combustion chamber rotating in opposite directions.

2. A gas turbine as defined in claim 1 wherein said slots are inclined with respect to the direction of rotation of said rotors as well as with respect to said plane of injection, and further comprising additional slots disposed in said combustion chamber wall with the axis thereof essentially coinciding with said plane of injection, whereby the combustion air enters said combustion chamber through the additional slots in a direction essentially opposite to the direction of fuel injection.

3. A gas turbine as defined in claim 1 wherein said fuel injection means is made of a material having relatively low heat conductivity.

4. A gas turbine provided with a compressor rotor and a turbine rotor disposed adjacent one another and with rotary fuel injection means secured therebetween and defining a plane of injection, comprising an annularly shaped double-walled combustion chamber surrounding at least in part said rotors, the space between the two walls of said combustion chamber forming a receiving space for the compressed combustion air compressed and supplied by said compressor rotor, and means for supplying the compressed combustion air from said compressor rotor to said receiving space and therefrom to said annularly shaped combustion chamber through a plurality of slots disposed in the inner one of said two combustion chamber walls, said slots being disposed symmetrically on both sides with respect to said plane of said injecting means to thereby produce oppositely directed secondary combustion air vortexes in said combustion chamber, said combustion chamber being provided with an exit passage, and wherein said turbine is provided with staitonary guide vanes of hollow construction to enable the passage of said compressed air therethrough from said receiving space to the interior space formed between the inner wall of said two walls and said guide vanes.

5. A gas turbine provided with a compressor rotor and a turbine rotor disposed adjacent one another and with rotary fuel injection means secured therebetween and defining a plane of injection, comprising an annularly shaped double-walled combustion chamber surrounding at least in part said rotors, the space between the two walls of said combustion chamber forming a receiving space for the compressed combustion air compressed and supplied by said compressor rotor, and means for supplying the compressed combustion air from said compressor rotor to said receiving space and therefrom to said annularly shaped combustion chamber through a plurality of slots disposed in the inner one of said two combustion chamber walls, said slots being disposed symmetrically on both sides with respect to said plane of said injecting means to thereby produce oppositely directed secondary combustion air vortexes in said combustion chamber, said combustion chamber being provided with an exit passage, and wherein said turbine is provided with stationary guide vanes of hollow construction to enable the passage of said compressed air therethrough from said receiving space to the interior space formed between the inner wall of said two walls and said guide vanes, said slots being disposed in said inner wall of said combustion chamber to enable the flow of compressed combustion air from said receiving space and from said interior space into said combustion chamber, said slots being inclined with respect to the direction of rotation of said rotors and with respect to the plane of injection.

6. A gas turbine having a shaft and provided with a compressor rotor and a turbine rotor made as separate parts and mounted on said shaft adjacent one another in nested back-to-back relationship and provided with rotary fuel injection means secured therebetween and consisting of an atomizer disk, comprising an annularly shaped double-walled combustion chamber surrounding said rotors, the space between the two walls of said combustion chamber forming a receiving space for the compressed combustion air compressed and supplied by said compressor rotor, means for supplying fuel through said shaft to said atomizer disk and for spraying the fuel directly into said combustion chamber through an aperture provided in the disk as a result of the centrifugal forces produced by rotation of said disk, and means for supplying the compressed combustion air from said compressor rotor to said receiving space and therefrom to said annularly shaped combustion chamber through a plurality of slots disposed in the inner one of said two combustion chamber walls, said slots being disposed symmetrically on both sides with respect to the plane of said fuel-injecting means to thereby produce oppositely directed secondary combustion air vortexes in said combustion chamber, said compressed combustion air effectively cooling said walls during the flow thereof through said receiving space, said slots being inclined with respect to the direction of rotation of said rotors as well as with respect to the plane of injection defined by said atomizer disk, and further comprising additional slots disposed along the periphery of said inner combustion chamber wall with the axis thereof extending in a direction essentially opposite to the direction of injected fuel, said atomizer disk being made of material having a low heat conductivity, said combustion chamber being provided with an exit passage having guide vanes therein, said guide vanes being of hollow construction to enable passage therethrough of part of said compressed combustion air.

7. A gas turbine having a shaft and provided with a compressor rotor and a turbine rotor made as separate parts and mounted on said shaft adjacent one another in back-to-back relationship and provided with rotary fuel injection means secured therebetween and consisting of an atomizer disk, and further provided with an annularly shaped double-walled combustion chamber surrounding said rotors, comprising a receiving space formed by the two walls of said combustion chamber for receiving the entire volume of the combustion air compressed and supplied by said compressor rotor, means for supplying the compressed combustion air from said compressor rotor to said receiving space and therefrom to said annularly shaped combustion chamber through a plurality of slots in the inner one of said two combustion chamber walls, said slots being disposed symmetrically on both sides with respect to the plane of rotation of said fuel injection means and inclined with respect to the direction of rotation of said fuel injection means as well as with respect to said plane, and additional slots being disposed along the periphery of said inner combustion chamber wall with the axis thereof lying substantially in the plane of rotation of said fuel injection means to thereby produce oppositely directed secondary combustion air vortexes in said combustion chamber, said compressed combustion air effectively cooling said walls during the flow thereof through said receiving space, and means for supplying fuel through said shaft to said atomizer disk and for spraying the fuel directly into said combustion air vortexes in said combustion chamber through an aperture provided in the disk as a result of the centrifugal forces produced by rotation of said disk, to thereby assure intimate mixing of the fuel with said compressed combustion air, and high combustion efficiency.

8. A gas turbine as defined in claim 7 wherein said atomizer disk is made of material having a low heat conductivity.

References Cited in the file of this patent

UNITED STATES PATENTS

| 2,694,291 | Rosengart | Nov. 16, 1954 |

FOREIGN PATENTS

| 491,080 | Canada | Mar. 10, 1953 |
| 699,865 | Great Britain | Nov. 18, 1953 |